(12) United States Patent
Adams et al.

(10) Patent No.: US 8,898,641 B2
(45) Date of Patent: Nov. 25, 2014

(54) MANAGING TRANSACTIONS WITHIN A MIDDLEWARE CONTAINER

(75) Inventors: Martin E. D. Adams, Southampton (GB); William Bittles, Winchester (GB); John W. Duffell, Winchester (GB); Yue Wang, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 13/362,273

(22) Filed: Jan. 31, 2012

(65) Prior Publication Data

US 2013/0198722 A1 Aug. 1, 2013

(51) Int. Cl.
*G06F 9/44* (2006.01)

(52) U.S. Cl.
USPC ........... 717/127; 717/100; 717/124; 717/125; 717/128

(58) Field of Classification Search
CPC ... G06F 8/20; G06F 11/3466; G06F 11/3636; G06F 11/3664; G06F 11/3688
See application file for complete search history.

(56) References Cited

U.S. PATENT DOCUMENTS

| | | | |
|---|---|---|---|
| 6,571,270 B1 * | 5/2003 | Lai et al. | 718/101 |
| 7,159,224 B2 | 1/2007 | Sharma et al. | |
| 7,653,905 B1 | 1/2010 | Lingamneni | |
| 7,831,693 B2 | 11/2010 | Lai | |
| 7,849,188 B2 | 12/2010 | Yu | |
| 8,056,060 B2 * | 11/2011 | Bicheno et al. | 717/127 |
| 8,117,601 B2 * | 2/2012 | Owens et al. | 717/128 |
| 8,689,187 B2 * | 4/2014 | Esposito et al. | 717/124 |
| 2008/0059964 A1 | 3/2008 | Khodabakchian et al. | |
| 2008/0184206 A1 * | 7/2008 | Vikutan | 717/127 |
| 2009/0265681 A1 * | 10/2009 | Beto et al. | 717/100 |
| 2012/0042302 A1 * | 2/2012 | Sikandar et al. | 717/125 |

OTHER PUBLICATIONS

Rayns et al., Exploring Systems Monitoring for CICS Transaction Gateway, IBM Redbooks, Apr. 2008, 410 pages.*
Smith et al., Proposing SQL statement coverage metrics, May 2008, 8 pages.*
Feldman et al., Usability testing with total-effort metrics, Oct. 2009, 4 pages.*
Whalen et al., Coverage metrics for requirements-based testing, Jul. 2006, 11 pages.*
Bekman, Stas and Cholet, Eric. "Practical mod_perl: 21.7.3. Detecting Hanging Processes [online]". O'Reilly and Associates, 2003 [retrieved on Jun. 13, 2011]. © 2007 StasoSphere. Retrieved from the internet: <URL: http://modperlbook.org/html/21-7-3-Detecting-Hanging-Processes.html>.

(Continued)

*Primary Examiner* — Thuy Dao
(74) *Attorney, Agent, or Firm* — Ronald Kaschak; Jinesh P. Patel (57) ABSTRACT

A computer collects first test metrics on a transaction hosted within a middleware container, and is executing within a first environment. The computer generates baseline values of expected execution behavior of the transaction based on the first test metrics. The computer collects second test metrics on the transaction hosted within the middleware container, and is executing within a second environment. The computer compares the second test metrics to the baseline values. The computer determines whether the second test metrics satisfy the baseline values. In response to the second test metrics not satisfying the baseline values, the computer identifies the transaction as a candidate for cancellation.

15 Claims, 3 Drawing Sheets

(56) References Cited

OTHER PUBLICATIONS

IBM. "Investigating loops that are not detected by CICS". [online] CICS Transaction Server v2.3. Date printed: Jun. 13, 2011. Retrieved from the internet: <URL: http://publib.boulder.ibm.com/infocenter/cicsts/v2r3/index.jsp?topic=/com.ibm.cics.ts23.doc/dfhs1/dfhs12c.htm>.

IBM. "What sort of loop is indicated by the symptoms?" [online]. CICS Transaction Server v2.3. Date printed: Jun. 13, 2011. Retrieved from the internet: <URL: http://publib.boulder.ibm.com/infocenter/cicsts/v2r3/topic/com.ibm.cics.ts23.doc/dfhs1/dfhs1lb.htm>.

Wissink, Brad. "Re: Detecting looping CICS transaction". IBM Mainframe Discussion List [Email Protected] [online]. IBM-main@BAMA.us.edu, Thursday, May 29, 2008; [retrieved on Jun. 13, 2011]. Retrieved from the internet: <URL:http://www.mail-archive.com/ibm-main@bama.ua.edu/msg75497.html>.

\* cited by examiner

MANAGING TRANSACTIONS WITHIN A MIDDLEWARE CONTAINER

BACKGROUND

1. Field of the Invention

The present invention relates generally to managing transactions made up of one or more program functions running within a middleware container environment, and more specifically to monitoring behavior of the transactions.

2. Description of the Related Art

As competition increases between business organizations, each organization tends to focus on objectives that include reducing cost, adapting rapidly to change in the business environment, and improving customer satisfaction. To accomplish these objectives more business transactions are becoming electronically automated. As a result, managing the transactions in a timely manner by utilizing a middleware container, for example, a transaction server, a web server, or Enterprise JavaBean (EJB) container is a critical aspect for business continuity.

A transaction is one or more program functions (i.e., program code) to perform a group of tasks, and execution of the transaction can be managed within a middleware container. A task is a method, operation, process, or step to implement an objective of the transaction. The objective of the transaction may include electronically transferring money from bank account X to bank account Y, electronically ordering an item from an online catalog, or calling another transaction that performs another objective. Moreover, a middleware container is typically a software component that offers a variety of application architectural services to the end-user. The architectural services offered by the middleware container to the end-user can include beginning a transaction, committing a transaction, rolling back a transaction, and data synchronization.

It is known for a software developer to write program code to implement a transaction that is hosted within the middleware container. In addition, for complex software applications, a software developer may write program code to implement a transaction that utilizes other transactions, including those from third parties.

It is also known for a middleware container to identify that a task of a transaction is failing by tracking the amount of time to complete the task, and then determining whether the amount of time to complete the task exceeds a pre-determined threshold value (i.e., timeout value) defined by a system programmer/administrator. Specifically, if the amount of time to complete the task exceeds the pre-determined threshold value, then the task and corresponding transaction are considered to be failing and are identified. However, it is difficult for the middleware container to identify a failing transaction in a situation where the amount of time for each task of the transaction to complete does not exceed the pre-determined threshold value, but the combination of each task running in a sequence loops endlessly without terminating. A transaction having a combination of tasks that loops endlessly without terminating, is considered a failing transaction.

Furthermore, it is also known for transaction servers to utilize pre-determined threshold values (i.e., timeouts values) as baselines for determining whether a transaction is successfully completed. However, utilizing pre-determined threshold values as baselines for determining whether the transaction completes successfully can be complicated in scenarios where the transaction interacts with multiple other transactions. Specifically, in scenarios where the transaction interacts with multiple other transactions it can be difficult to determine which of the transactions are actually failing successful completion, because the pre-determined threshold values may not accurately reflect the expected behavior of the transactions. Thus, the challenge of managing a transaction hosted within a middleware container, and identifying whether the transaction is considered as failing, continues to persist.

SUMMARY

Aspects of an embodiment of the present invention disclose a method, computer system, and program product for managing a transaction. A computer collects first test metrics on a transaction hosted within a middleware container, and is executing within a first environment. The computer generates baseline values of expected execution behavior of the transaction based on the first test metrics. The computer collects second test metrics on the transaction hosted within the middleware container, and is executing within a second environment. The computer compares the second test metrics to the baseline values. The computer determines whether the second test metrics satisfy the baseline values. Responsive to the second test metrics not satisfying the baseline values, the computer identifies the transaction as a candidate for cancellation.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a transaction process monitoring program for managing transactions of a software application. The transaction process monitoring program can provide functionality to generate metrics that model a transaction's behavior and assist a middleware container with managing the transaction. Specifically, the transaction process monitoring program can identify a transaction, managed by the middleware container, that loops endlessly without terminating, as a failed transaction and a candidate for cancellation. The middleware container behaves as a parent program or software environment to manage execution of one or more program functions (i.e., program code) or commands, or other suitable software routines. The middleware container can provide scalable transaction support for software applications, even in scenarios where a transaction consists of programmatic calls (e.g., function calls or method calls) to numerous other transactions. Transaction servers, Enterprise JavaBean (EJB) containers, and web servers are some examples of middleware containers that can manage transactions.

Figure 1:
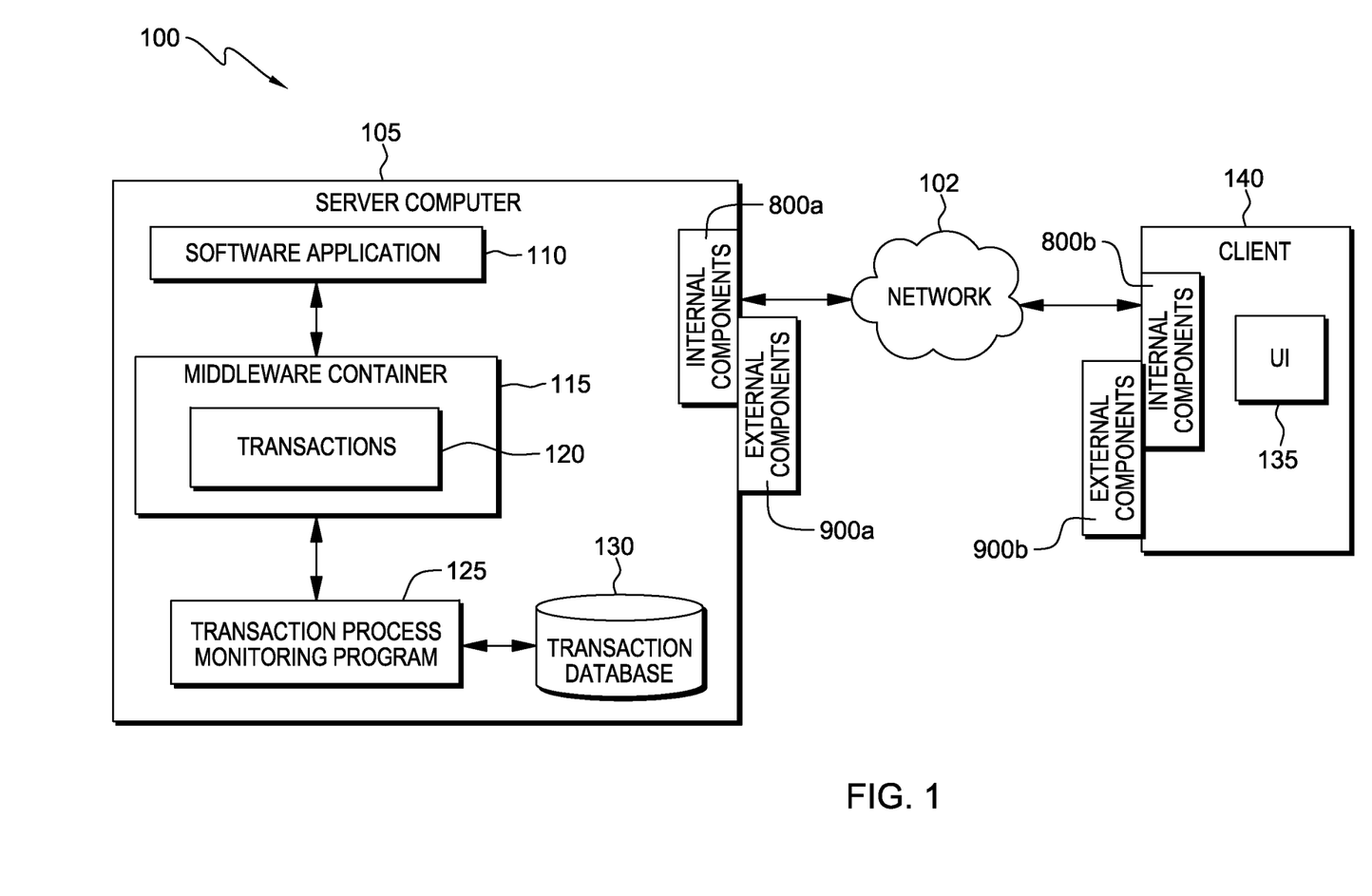
FIG. 1 is a block diagram of a distributed computer system that includes a server computer having a middleware container and transaction database that interact with a transaction process monitoring program to manage transactions of a software application, and a client computer having a user interface that enables an end-user to interact with the software application according to an embodiment of the present invention.

FIG. 1 illustrates computer system 100 that includes server computer 105 having software application 110, and middleware container 115 that manages one or more transactions 120. Server computer 105 further includes transaction process monitoring program 125 and transaction database 130, which are also utilized to manage transactions 120 hosted within middleware container 115. Computer system 100 is first deployed in a software test environment to obtain first test metrics on transactions 120. Subsequently, computer system 100 is deployed to a software production environment for access by an end-user (i.e., a customer) of software application 110 that may utilize some or all of transactions 120. In addition, server computer 105 is connected, via network 102, to client computer 140 having user interface (UI) 135. Server computer 105 and client computer 140 each include respective internal components 800a and 800b, and respective external components 900a and 900b, as described below in more detail with respect to FIG. 3.

Furthermore, as part of computer system 100, network 102 connects server computer 105 to client computer 140, which allows for the sharing of resources. The resources include transactions 120, as well as middleware container 115 and transaction process monitoring program 125 that manage the transactions. Network 102 may be an intranet, a local area network (LAN), and/or a wide area network (WAN). Therefore, network 102 may include wired connections and/or wireless connections, and can handle a variety of network protocols to support communication between server computer 105 and client computer 140. In preferred embodiments of the present invention, client computer 140 may be a laptop computer, tablet personal computer, desktop computer, personal digital assistant (PDA), or smart phone that combines functionality of a PDA and a mobile phone. Therefore, client computer 140 can be any programmable electronic device as described below in more detail with respect to FIG. 3.

As mentioned above, client computer 140 includes UI 135 for an end-user to access and interact with software application 110 that may utilize some or all transactions 120. Software application 110 can be any type of program that communicates with middleware container 115 that provides an environment for hosting and managing transactions 120. Middleware container 115 implements business logic to coordinate transactions 120. Business logic refers to rules (e.g., business rules) that govern steps to complete transactions 120, wherein each of the transactions is one or more program functions (i.e., program code) to perform a group of tasks. For example, transactions 120 may be an EJB, a web service, an XA transaction, or other program code that provides functionality for use by software application 110. The functionality provided may include electronically ordering an item from an online catalog, electronically transferring funds between bank accounts, electronically booking a travel reservation, electronically paying a bill, or calling other transactions 120. Thus, in one embodiment, software application 110 may be an order management software application that allows the end-user to query details from an online catalog, order an item from the catalog, and ship the item to a customer. In alternative embodiments, software application 110 may be a banking software application that allows the end-user to transfer funds between bank accounts, an airline reservation application that allows the end-user to make travel related bookings, an electronic payment application that allows the end-user to pay bills, or any other suitable software program that utilizes middleware container 115 to manage transactions 120.

As described above, while computer system 100 is deployed to a software test environment, first test metrics on transactions 120 are collected by middleware container 115. In one embodiment, the first test metrics collected by middleware container 115 may include input size for each transaction 120, the number of switches between tasks for each of the transactions, average amount of time spent per each of the transactions, and average amount of time spent per task of each of the transactions. The first test metrics collected form a historical log of data that can be processed by transaction process monitoring program 125 to generate baseline values that represent a pattern of expected execution behavior of transactions 120. The first test metrics that are collected are stored in transaction database 130 on a hard drive of server computer 105. However, in other embodiments, the first test metrics that are collected may be stored on any suitable computer-readable tangible storage device accessible to transaction process monitoring program 125.

Subsequent to collecting the first test metrics, transaction process monitoring program 125 processes the first test metrics to generate the baseline values for transactions 120. The baseline values represent expected execution behavior of transactions 120 that are hosted within middleware container 115. Thus, the baseline values are based on data gathered from prior execution of transactions 120 within the software test environment. Specifically, in order to obtain the baseline values transaction process monitoring program 125 can perform linear regression of the following pairs of first test metrics: input size for each of transactions 120 and number of switches between tasks of the corresponding transactions, input size for each of the transactions and average amount of time spent per each of the corresponding transactions, and input size for each of the transactions and average amount of time spent per task of each of the corresponding transactions. Next, utilizing the pairs of first test metrics, transaction process monitoring program 125 utilizes linear regression to determine a line of best fit from which the baseline values can be generated. The baseline values generated include the expected number of switches between tasks for each of the transactions 120 based on input size, the expected amount of time spent per each of the transactions based on input size, and the expected amount of time spent per task of each of the transactions based on input size.

Furthermore, as used herein, a "correlation coefficient" refers to a number between −1 and 1, and the correlation coefficient measures the degree to which two variables (e.g., first test metrics) are linearly related. In the disclosed embodiment, the variables include first test metrics collected on transactions 120 hosted and managed by middleware container 115 within a software test environment. If the correlation coefficient for two of the first test metrics collected is near 1, then a positive linear relationship exists between the two first test metrics. If the correlation coefficient for two of the first test metrics collected is near −1, then a negative linear relationship exists between the two first test metrics. However, if the correlation coefficient for two of the first test metrics collected is near 0, then there is substantially no linear relationship between the two first test metrics. As more first test metrics are collected by transaction process monitoring program 125 and if a linear relationship exists between two of the first test metrics collected, then a baseline value obtained by performing linear regression of the two first test metrics and determining the line of best fit can provide a more statistically accurate and precise representation of expected execution behavior of transactions 120.

Moreover, in another embodiment, if the relationship between two of the first test metrics collected is substantially not linear (i.e., the correlation coefficient is near 0), then polynomial interpolation may be utilized to determine a polynomial function that more accurately and precisely models the relationship between the two first test metrics. Thus, the polynomial function can also provide an accurate and precise representation of expected execution behavior of transactions 120.

Accordingly, baseline values may be generated by performing linear regression, polynomial interpolation, or are any other suitable statistical modeling technique utilizing the first test metrics collected on transactions 120 hosted within middleware container 115.

Subsequent to generating the baseline values computer system 100 is deployed in a software production environment. Next, transaction process monitoring program 125 performs comparisons between the baseline values of transactions 120 and second test metrics collected on the transactions executing within the software production environment. The second test metrics collected on transactions 120 executing within the software production environment include: input size for each of the transactions, the number of switches between tasks for each of the transactions, average amount of time spent per each of the transactions, and average amount of time spent per task of each of the transactions. Thus, the comparisons performed allow transaction process monitoring program 125 to determine whether transactions 120 deviate from expected execution behavior. Specifically, the comparisons can identify a transaction 120, hosted within middleware container 115, that loops endlessly without terminating, as a candidate for cancellation. For example, if a second test metric collected on any of transactions 120 executing within the software production environment deviates from a corresponding baseline value by a configurable threshold level (e.g., the configurable threshold level may equal three standard deviations), then the transactions are identified as candidates for cancellation by transaction process monitoring program 125. Next, transaction process monitoring program 125 can send a message notification to middleware container 115 to indicate specific transactions 120 that are identified as candidates for cancellation, and a system programmer/administrator can view the message notification via a screen of a display device that is connected to server computer 105 or client computer 140. If middleware container 115 receives the message notification that one or more of transactions 120 are a candidate for cancellation, then either the system programmer/administrator can determine whether or not to cancel any of the transactions or a configurable script may be executed, on a scheduled basis, to automatically cancel any of the transactions.

As mentioned above, computer system 100 is first deployed in a software test environment to obtain first test metrics on transactions 120 executing in the software test environment and are hosted within middleware container 115. In the disclosed embodiment, software application 110 is an order-entry application. However, in other embodiments software application 110 may be a banking software application, an airline reservation software application, an electronic payment application, or any other suitable computer program that utilizes a middleware container 115 to host and manage transactions 120. Thus, in the disclosed embodiment, a test simulation is performed within the software test environment to simulate placement of an order for an item, via UI 135, which initiates execution of one or more transactions 120 that include the tasks of checking an inventory relational database management system (RDBMS), scheduling a shipping request, and sending a bill to a customer. Transactions 120 are hosted and managed by middleware container 115 within the software test environment. Middleware container 115 collects first test metrics on transactions 120 that are executing. The first test metrics are stored in transaction database 130 on a hard drive of server computer 105, or on any suitable computer-readable tangible storage device accessible to transaction process monitoring program 125. Subsequently, computer system 100 is deployed to a software production environment and middleware container 115 collects second test metrics on transactions 120 that are now executing within the production environment. The second test metrics collected on transactions 120 executing within the software production environment include input size for each of the transactions, the number of switches between tasks for each of the transactions, average amount of time spent per each of the transactions, and average amount of time spent per task of each of the transactions. Moreover, the second test metrics collected on transactions 120, executing within the production environment, are stored in transaction database 130 on a hard drive of server computer 105, or any suitable computer-readable tangible storage device accessible to transaction process monitoring program 125.

Figure 2:
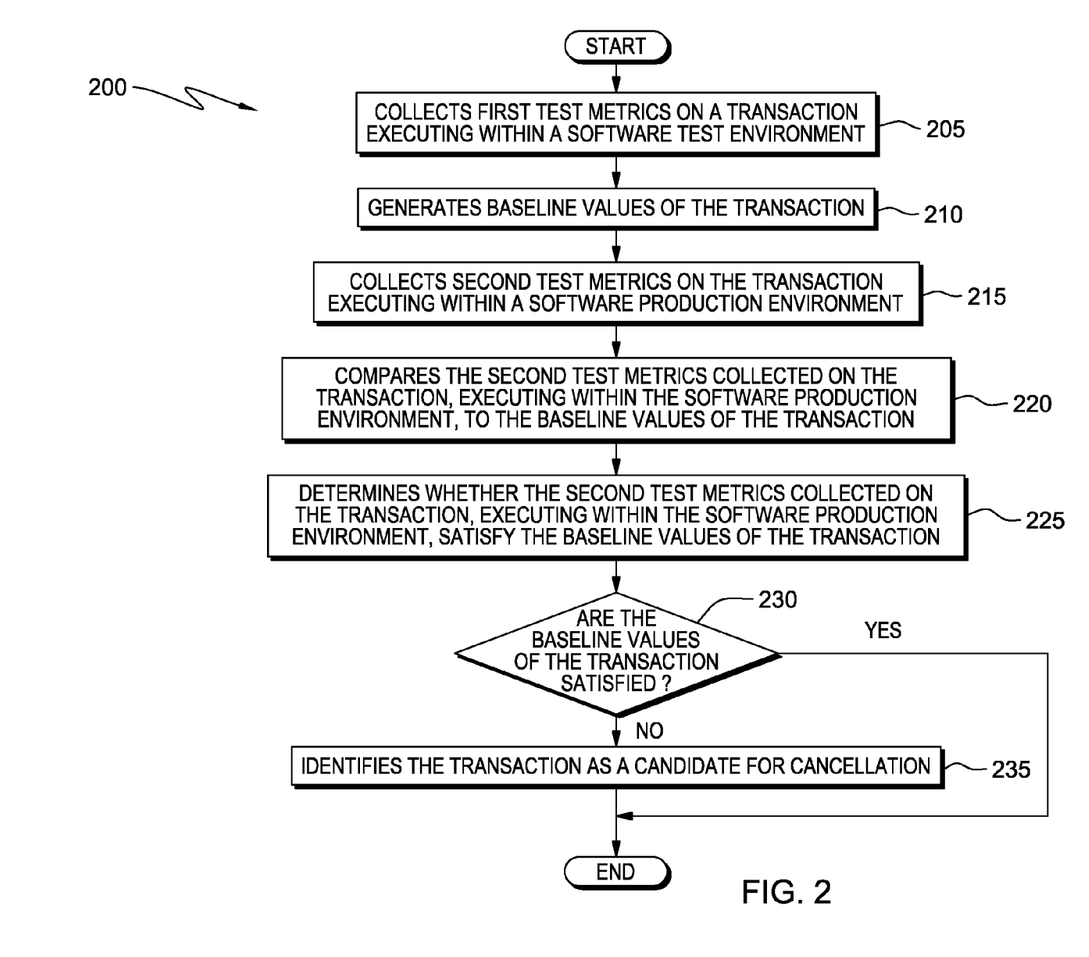
FIG. 2 is a flowchart illustrating operations of the transaction process monitoring program utilized to identify a transaction as a candidate for cancellation according to an embodiment of the present invention.

FIG. 2 is flowchart 200 illustrating the steps of transaction process monitoring program in more detail. Transaction 120 is hosted within middleware container 115 of server computer 105. Transaction process monitoring program 125 collects first test metrics on transaction 120 executing within a software test environment (step 205). Transaction process monitoring program 125 processes the first test metrics and generates baseline values of transaction 120 (step 210). The baseline values represent expected execution behavior of transaction 120.

As described above, to obtain the baseline values, transaction process monitoring program 125 utilizes the first test metrics collected on transaction 120 to perform a linear regression of the following pairs of information: input size for the transaction and number of switches between tasks of the transaction, input size for the transaction and average amount of time spent per the transaction, and input size for the transaction and average amount of time spent per task of the transaction. Next, transaction process monitoring program 125 determines a line of best fit from which the baseline values can be generated. The baseline values include the expected number of switches between tasks for transaction 120 based on input size, the expected amount of time spent per the transaction based on input size, and the expected amount of time spent per task of the transaction based on input size.

Subsequent to generating the baseline values, the transaction process monitoring program 125 collects second test metrics collected on transaction 120 executing within a software production environment (step 215). Next, transaction process monitoring program 125 compares the second test metrics collected on transaction 120, executing within the software production environment, to the baseline values of the transaction (step 220). Specifically, the following comparisons are performed between the second test metrics collected and their corresponding baseline values generated from the first test metrics: the metric of the number of switches between tasks of transaction 120 is compared to the expected number of switches between tasks for the transaction, the metric of average amount of time spent per the transaction is compared to the expected amount of time spent per the transaction, and the metric of average amount of time spent per task of the transaction is compared to the expected amount of time spent per task of the transaction.

Next, transaction process monitoring program 125 determines whether the second test metrics collected on transaction 120, executing within the software production environment, satisfy the baseline values of the transaction (step 225). Baseline values are satisfied if the second test metrics collected on transaction 120 executing within the software production environment do not deviate from corresponding baseline values by a configurable threshold level (e.g., the configurable threshold level may equal three standard deviations). Thus, if the baseline values of transaction 120 are satisfied (decision 230, "yes" branch), then transaction process monitoring program 125 does not identify the transaction as a candidate for cancellation and ends.

However, if the baseline values of transaction 120 are not satisfied (decision 230, "no" branch) and second test metrics collected on the transaction, executing within the software production environment, deviate from the baseline values by a configurable threshold level (e.g., the configurable threshold level may equal three standard deviations), then transaction process monitoring program 125 identifies the transaction as a candidate for cancellation (step 235). Subsequently, transaction process monitoring program 125 can send a message notification to middleware container 115, which indicates that transaction 120 is identified as a candidate for cancellation. A system programmer/administrator can view the message notification via a screen of a display device connected to server computer 105 or client computer 140. The system programmer/administrator can determine whether or not to cancel transaction 120, or a configurable script may be executed on a scheduled basis to automatically cancel the transaction that is identified by transaction process monitoring program 125 as a candidate for cancellation. As a result, transactions 120 that loop endlessly without terminating can be identified if the transactions have second test metrics that deviate from corresponding baseline values by a configurable threshold level (e.g., the configurable threshold level may equal three standard deviations).

As mentioned above, in an alternative embodiment, if the relationship between the first test metrics collected on transaction 120 executing within the software test environment is not linear, then polynomial interpolation may be utilized to determine a polynomial function that more accurately and precisely models the relationship between the test metrics. Baseline values may be obtained from the polynomial function. Therefore, the polynomial function can also provide an accurate and precise representation of expected execution behavior of transaction 120 managed by middleware container 115 and transaction process monitoring program 125, in scenarios where a linear relationship does not exist between the test metrics collected.

Figure 3:
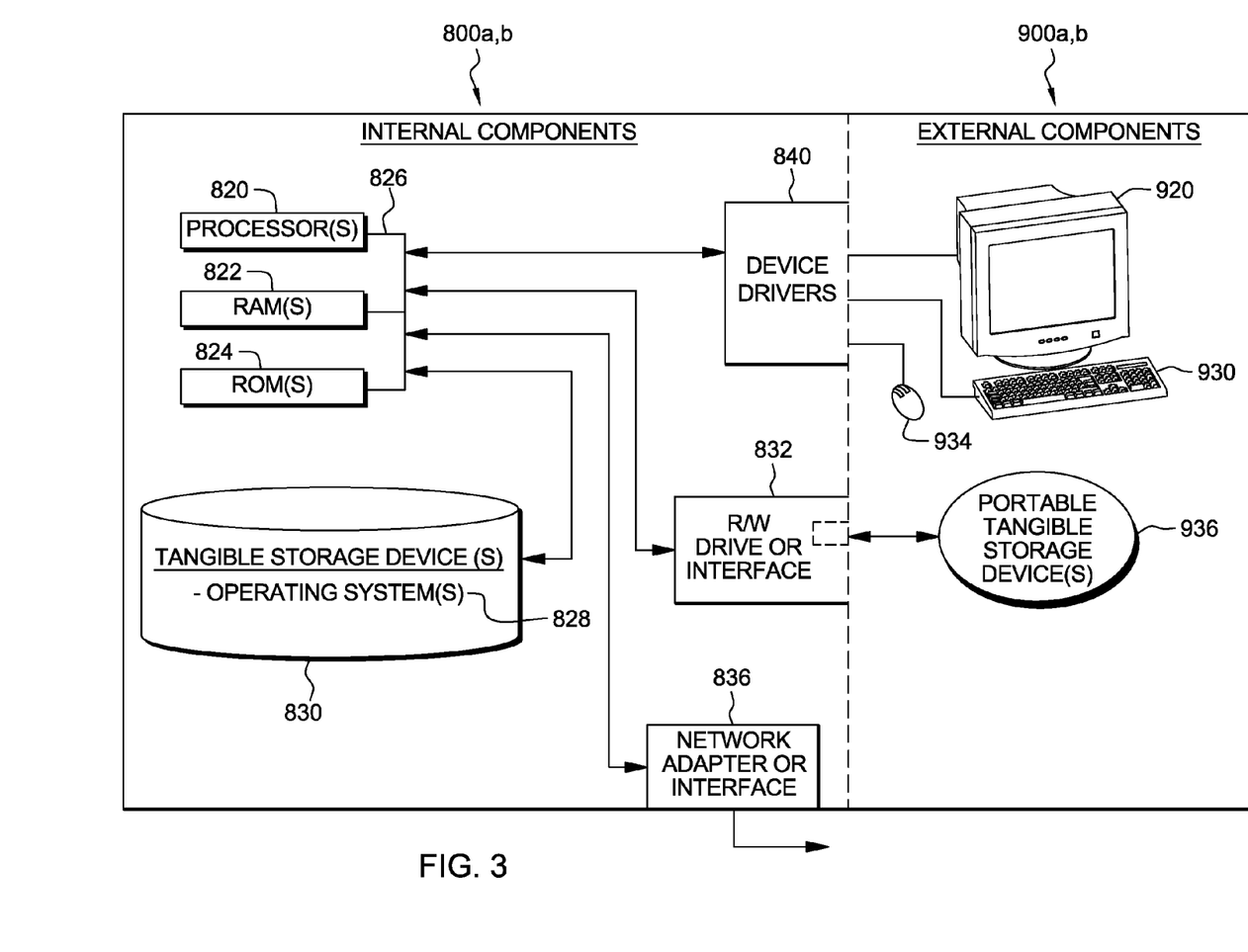
FIG. 3 is a block diagram depicting internal and external components of the server computer and the client computer according to an embodiment of the present invention.

FIG. 3 is a block diagram depicting a set of internal components 800a and a set of external components 900a that correspond to server computer 105, as well as a set of internal components 800b and a set of external components 900b that correspond to client computer 140. Internal components 800a and 800b each include one or more processors 820, one or more computer-readable RAMs 822, one or more computer-readable ROMs 824 on one or more buses 826, and one or more operating systems 828 and one or more computer-readable tangible storage devices 830. The one or more operating systems 828, software application 110, middleware container 115, transaction process monitoring program 125, and transaction database 130 on server computer 105; and UI 135 in client computer 140 are stored on one or more of the respective computer-readable tangible storage devices 830 for execution by one or more of the respective processors 820 via one or more of the respective RAMs 822 (which typically include cache memory). In one embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a and 800b includes a R/W drive or interface 832 to read from and write to one or more portable computer-readable tangible storage devices 936 such as CD-ROM, DVD, memory stick, magnetic tape, magnetic disk, optical disk or semiconductor storage device. Software application 110, middleware container 115, transaction process monitoring program 125, and transaction database 130 on server computer 105; and UI 135 in client computer 140 can be stored on one or more of the respective portable computer-readable tangible storage devices 936, read via the respective R/W drive or interface 832 and loaded into the respective hard drive 830.

Furthermore, each set of internal components 800a and 800b also includes network adapters or interfaces 836 such as TCP/IP adapter cards, wireless wi-fi interface cards, or 3G or 4G wireless interface cards or other wired or wireless communication links. Software application 110, middleware container 115, transaction process monitoring program 125, and transaction database 130 on server computer 105; and UI 135 in client computer 140 can be downloaded to respective computers 105 and 140 from an external computer or external storage device via a network (for example, the Internet, a LAN, or a WAN) and respective network adapters or interfaces 836. From network adapter or interface 836, software application 110, middleware container 115, transaction process monitoring program 125, and transaction database 130 on server computer 105; and UI 135 in client computer 140 can be loaded into respective hard drive 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer-readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of an embodiment of the invention may be written in any combination of one or more programming languages, including an object-oriented programming language such as Java, Smalltalk, C++ or the like and conventional procedural programming languages, such as the "C" programming language or similar programming languages. The program code may execute entirely on the end-user's computer, partly on the end-user's computer, as a stand-alone software package, partly on the end-user's computer and partly on a remote computer, or entirely on a remote computer or server. In the latter scenario, the remote computer may be connected to the end-user's computer through any type of network, including a LAN or WAN, or the connection may be made to an external computer (for example, through the Internet using an Internet Service Provider). Alternatively, the functions of the aforementioned programs can be implemented in whole or in part by computer circuits and other hardware (not shown).

Based on the foregoing, a method, computer system, and computer program product have been disclosed for managing a transaction. However, numerous modifications substitutions can be made without deviating from the scope of an embodiment of the invention. Therefore, one or more embodiments of the invention have been disclosed by way of example and not limitation.

What is claimed is:

1. A method for managing a transaction, the method comprising the steps of:
   a computer collecting first test metrics on a transaction hosted within a middleware container, and is executing within a first environment;
   the computer generating baseline values of expected execution behavior of the transaction, based on the first test metrics, wherein generating the baseline values of expected execution behavior of the transaction comprises utilizing linear regression of a pair of the first test metrics, if the pair of the first test metrics has a relationship that is linear, and wherein generating the baseline values of expected execution behavior of the transaction comprises utilizing polynomial interpolation to determine a polynomial function, if the pair of the first test metrics has a relationship that is not linear;
   the computer collecting second test metrics on the transaction hosted within the middleware container, and is executing within a second environment;
   the computer comparing the second test metrics to the baseline values;
   the computer determining whether the second test metrics satisfy the baseline values; and
   responsive to the second test metrics not satisfying the baseline values, the computer identifying the transaction as a candidate for cancellation.

2. The method of claim 1, wherein the step of the computer generating the baseline values of expected execution behavior comprises generating an expected number of switches between tasks for the transaction based on input size, an expected amount of time spent per the transaction based on input size, and an expected amount of time spent per task of the transaction based on input size.

3. The method of claim 1, wherein the first test metrics are collected by the computer within a software test environment, and the second test metrics are collected by the computer within a software production environment.

4. The method of claim 3, wherein the first test metrics and the second test metrics collected by the computer each include input size for the transaction, a number of switches between tasks for the transaction, average amount of time spent per the transaction, and average amount of time spent per task of the transaction, and wherein the middleware container is a transaction server, Enterprise JavaBean (EJB) container, or web server that manages transactions.

5. The method of claim 1, wherein the step of the computer determining whether the second test metrics satisfy the baseline values comprises the step of the computer determining if the second test metrics deviate from a corresponding baseline value by a configurable threshold level.

6. A computer program product for managing a transaction, the computer program product comprising:
   a computer-readable tangible storage memory and program instructions stored on the computer-readable tangible storage memory, the program instructions include:
   program instructions to collect first test metrics on a transaction hosted within a middleware container, and is executing within a first environment;
   program instructions to generate baseline values of expected execution behavior of the transaction, based on the first test metrics, wherein the program instructions to generate the baseline values of expected execution behavior of the transaction comprises utilizing linear regression of a pair of the first test metrics, if the pair of the first test metrics has a relationship that is linear, and wherein the program instructions to generate the baseline values of expected execution behavior of the transaction comprises utilizing polynomial interpolation to determine a polynomial function, if the pair of the first test metrics has a relationship that is not linear;
   program instructions to collect second test metrics on the transaction hosted within the middleware container, and is executing within a second environment;
   program instructions to compare the second test metrics to the baseline values;
   program instructions to determine whether the second test metrics satisfy the baseline values; and
   program instructions, responsive to the second test metrics not satisfying the baseline values, to identify the transaction as a candidate for cancellation.

7. The computer program product of claim 6, wherein the program instructions to generate the baseline values of expected execution behavior comprises generating an expected number of switches between tasks for the transaction based on input size, an expected amount of time spent per the transaction based on input size, and an expected amount of time spent per task of the transaction based on input size.

8. The computer program product of claim 6, wherein the first test metrics are collected by the program instructions on a computer within a software test environment, and the second test metrics are collected by the program instructions on the computer within a software production environment.

9. The computer program product of claim 8, wherein the first test metrics and the second test metrics collected by the program instructions each include input size for the transaction, a number of switches between tasks for the transaction, average amount of time spent per the transaction, and average amount of time spent per task of the transaction, and wherein the middleware container is a transaction server, Enterprise JavaBean (EJB) container, or web server that manages transactions.

10. The computer program product of claim 6, wherein the program instructions to determine whether the second test metrics satisfy the baseline values comprises program instructions to determine if the second test metrics deviate from a corresponding baseline value by a configurable threshold level.

11. A computer system for managing a transaction, the computer system comprising:
one or more processors, one or more computer-readable memories, one or more computer readable storage media, and program instructions stored on the one or more storage media for execution by the one or more processors via the one or more memories, the program instructions comprising:
program instructions to collect first test metrics on a transaction hosted within a middleware container, and is executing within a first environment;
program instructions to generate baseline values of expected execution behavior of the transaction, based on the first test metrics, wherein the program instructions to generate the baseline values of expected execution behavior of the transaction comprises utilizing linear regression of a pair of the first test metrics, if the pair of the first test metrics has a relationship that is linear, and wherein the program instructions to generate the baseline values of expected execution behavior of the transaction comprises utilizing polynomial interpolation to determine a polynomial function, if the pair of the first test metrics has a relationship that is not linear;
program instructions to collect second test metrics on the transaction hosted within the middleware container, and is executing within a second environment;
program instructions to compare the second test metrics to the baseline values;
program instructions to determine whether the second test metrics satisfy the baseline values; and
program instructions, responsive to the second test metrics not satisfying the baseline values, to identify the transaction as a candidate for cancellation.

12. The computer system of claim 11, wherein the program instructions to generate the baseline values of expected execution behavior comprises generating an expected number of switches between tasks for the transaction based on input size, an expected amount of time spent per the transaction based on input size, and an expected amount of time spent per task of the transaction based on input size.

13. The computer system of claim 11, wherein the first test metrics are collected by the program instructions on a computer within a software test environment, and the second test metrics are collected by the program instructions on a computer within a software production environment.

14. The computer system of claim 13, wherein the first test metrics and the second test metrics collected by the program instructions each include input size for the transaction, a number of switches between tasks for the transaction, average amount of time spent per the transaction, and average amount of time spent per task of the transaction, and wherein the middleware container is a transaction server, Enterprise JavaBean (EJB) container, or web server that manages transactions.

15. The computer system of claim 11, wherein the program instructions to determine whether the second test metrics satisfy the baseline values comprises program instructions to determine if the second test metrics deviate from a corresponding baseline value by a configurable threshold level.

* * * * *